No. 641,645. Patented Jan. 16, 1900.
L. PARADIS & N. DESROSIERS.
HANSOM CAB.
(Application filed June 26, 1899.)
(No Model.) 3 Sheets—Sheet 1.
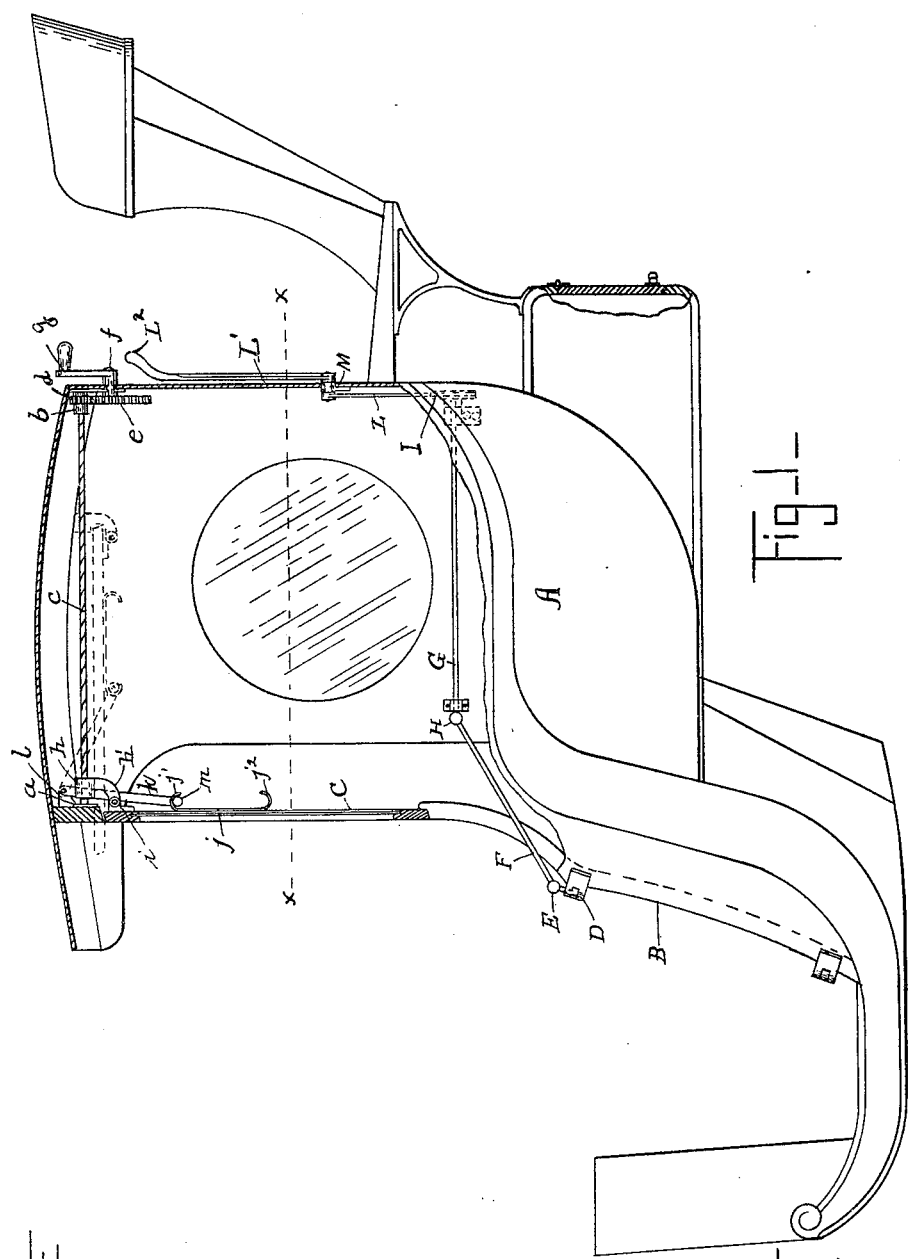
Witnesses:
H. B. Davis.
Thomas Sewall
Inventors
Lubin Paradis
Narcisse Desrosiers
by Edwin Planta
attorney

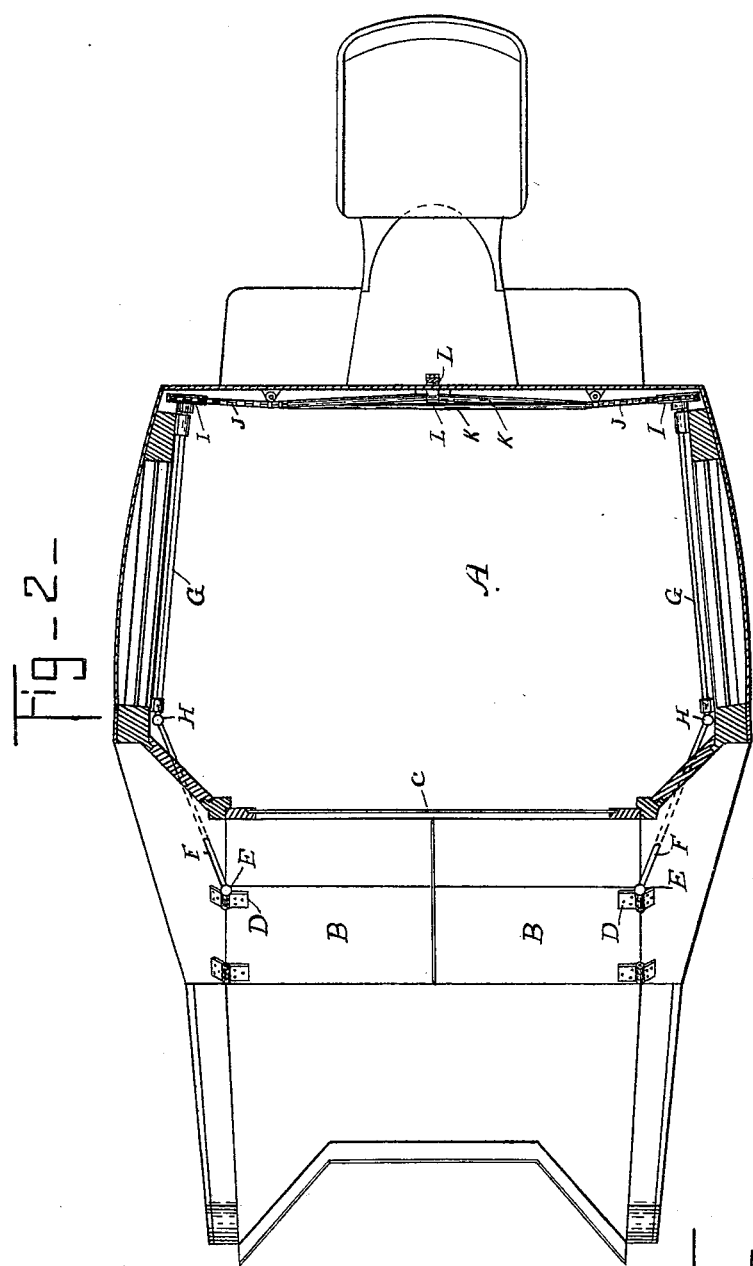

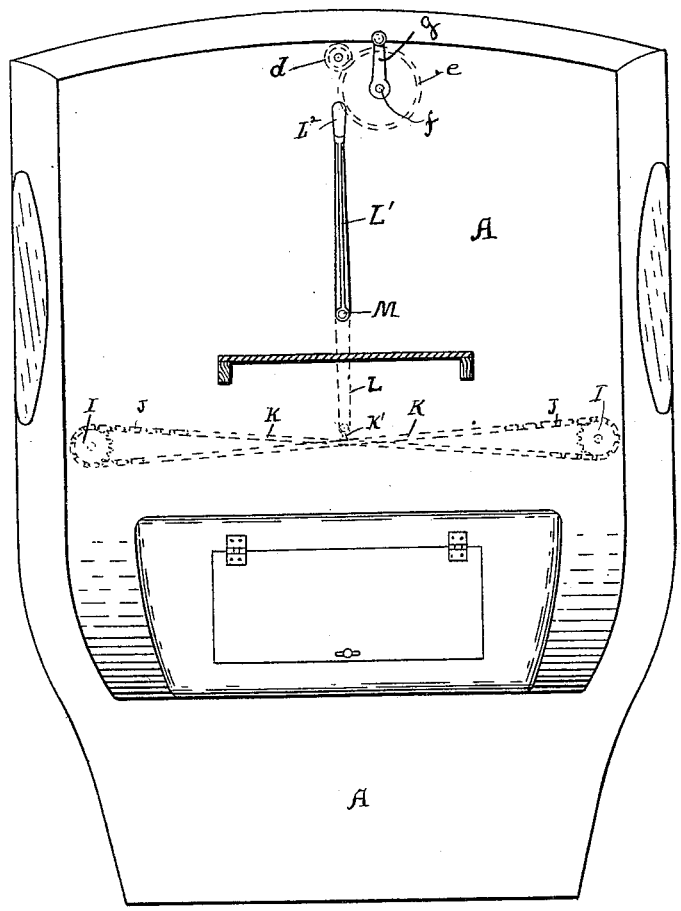
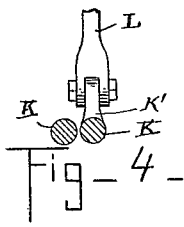

UNITED STATES PATENT OFFICE.

LUBIN PARADIS, OF CAMBRIDGE, AND NARCISSE DESROSIERS, OF BOSTON, MASSACHUSETTS.

HANSOM-CAB.

SPECIFICATION forming part of Letters Patent No. 641,645, dated January 16, 1900.

Application filed June 26, 1899. Serial No. 721,816. (No model.)

*To all whom it may concern:*

Be it known that we, LUBIN PARADIS, a citizen of the United States, residing at Cambridge, in the county of Middlesex, and NARCISSE DESROSIERS, a subject of the Queen of Great Britain, residing at Boston, in the county of Suffolk, State of Massachusetts, have invented certain new and useful Improvements in Hansom-Cabs, of which the following is a specification.

Our invention relates to that class of two-wheeled vehicles known as "hansom-cabs;" and the invention consists in a simple and efficient means for operating the window and the folding doors from the driver's seat, as hereinafter set forth, and pointed out in the claims.

Referring to the accompanying drawings, Figure 1 represents a side view, partially in section, of a hansom-cab embodying our invention. Fig. 2 is a sectional plan view taken on line $x\ x$ of Fig. 1. Fig. 3 is a rear view of the cab with the driver's seat removed and the foot-rest in section. Fig. 4 is a detail view showing the connection between the door-operating rods and the lever.

A represents the body of the cab, which is mounted upon springs secured to the axle in the usual manner.

B represents the folding doors, and C the window, which when in a closed position rests upon the upper edge of the doors B.

In order to operate the window to raise it up or down, as required, we employ the following mechanism: In suitable bearings $a$, secured to the front of the cab-body, and bearings $b$, secured to the rear of the body, is mounted a screw-threaded rod $c$, upon the rear end of which (but inside the body) is mounted a small cog-wheel $d$ in gear with a large cog-wheel $e$, mounted upon a stud $f$, that passes through the back of the body, and upon the end of which is mounted a lever $g$ within easy reach of the driver. Upon the screw-threaded rod $c$ is mounted a nut $h$, having a downwardly-projecting arm $h'$, pivoted to a bracket $i$, secured to the upper rail of the window-sash. On each side of the window-sash is secured a flat plate $j$, curved at each end to form hooks $j'\ j^2$.

K is a flat bar hinged at its upper end to a bracket $l$, secured to the front of the body and having at its lower end a roller $m$, upon which the upper hook $j'$ rests when the window is in the lowered position, said roller $m$ supporting the window-sash until it is partially raised, when the roller $m$ travels along the plate $j$ and enters the lower hook $j^2$ and supports the sash in the raised position, as shown in dotted lines.

In operation, supposing the window to be in the lowered position, as shown, and the driver desires to raise the same to the position shown in dotted lines, all he has to do is simply to give the lever $g$ a few turns—say three—which by means of the cog-wheel $e$ will transmit motion to the small gear $d$ and cause the screw-threaded rod to be rotated and will draw the nut $h$ back, and with it the upper end of the window-sash, the sash being carried by the roller $m$ until said sash has been drawn back sufficiently far for the roller $m$ to come into contact with the lower hook $j^2$, when said roller will travel with the sash and support the same. It will be seen that by this construction the window can be raised any height desired, in which position it will be retained, as the nut cannot shift upon the screw-threaded rod unless the same is operated by the lever through the cog-wheels.

In order to operate the folding doors B, the pintles of the upper hinge D are secured to the leaves that are attached to the door, and each of their upper ends is provided with a universal joint E, a rod or shaft F being also attached to each of said universal joints E and passing through the front sides of the body, the inner ends of which rods are attached to horizontal rods G by a universal joint H, the rear end of each of said shafts G being fitted with a sprocket-wheel I.

J J are short sprocket-chains that pass around the wheels I I. The ends of these chains are connected together by means of rods K K, one of which is formed with an upward projection K', to which the lower end of a lever L is attached. (See Fig. 4.) The upper end of this lever is secured to a stud M, that passes through the back of the cab, and to the outer end of this stud is secured another upright lever L', formed at its upper end with a handle L², by means of which the driver can operate the lever, and thus open or close the doors.

In operation, supposing the doors to be closed and the driver desires to open the same, he moves the lever L', which through stud M and lever L imparts motion to the rods K and sprocket-chains J J, thus causing a partial rotation of the sprocket-wheels I and the rods G, operating the rod F and the pintles of the upper hinges, thus causing the door to be thrown open. When it is desired to close the doors, the lever L' is moved in the opposite direction, when the operation is reversed, thus closing the doors.

What we claim is—

1. A cab, a window for the front thereof, a screw-threaded rod mounted in suitable bearings under the roof, and means for rotating said screw-threaded rod, in combination with a nut working upon said screw-threaded rod, said nut having an arm dependent therefrom, and pivoted to the upper portion of the window-sash, as set forth.

2. A cab, a window for the front thereof, a screw-threaded rod mounted in suitable bearings under the roof, a small cog-wheel mounted upon the end of said screw-threaded rod, a large cog-wheel in gear with the small cog-wheel, and a lever for rotating the same, in combination with a nut working on said screw-threaded rod having an arm pivoted to a bracket secured to the upper portion of the window-sash, as set forth.

3. A cab, and a window for the front thereof, having a flat bar provided with a hook at each end, secured to each side of the sash-frame, in combination with flat bars hinged at their upper ends to brackets secured to the front of the body, and having rollers at their lower ends for supporting and sustaining the window-sash in either the lowered or raised position, as set forth.

4. A cab, a window for the front thereof, a screw-rod mounted under the roof, means for rotating the same, a nut working thereon having an arm attached at its outer end to a bracket secured to the upper end of the window-sash, arms fulcrumed to the top of the body, each having a roller at its outer end, and plates having hooked ends secured to the sides of the sash for said rollers to work in, as set forth.

5. In a cab, folding doors for the same, the pintles of the upper hinges being secured to the leaves attached to the door, oblique rods connected to said pintles by universal joints, horizontal rods one on each side connected to the oblique rods by universal joints, and having at their rear ends sprocket-wheels, chains and rods for operating said sprocket-wheels, and levers for imparting motion to the rods and chains, as set forth.

6. In a cab, folding doors for the same, sprocket-wheels at the rear of the cab connected to the pintles of the upper door-hinges by rods and universal joints, crossed rods and chains connecting the sprocket-wheels, and a lever for operating said rods and chains, as set forth.

7. In a cab a longitudinal and an oblique rod on each side connected together by universal joints, the front ends of the oblique rods being connected by universal joints to the pintles of the upper hinges of the door, and the rear ends of the longitudinal rods having sprocket-wheels secured thereon, and means such as described for operating said sprocket-wheels by means of a lever, as set forth.

In testimony whereof we have affixed our signatures in presence of two witnesses.

LUBIN PARADIS.
NARCISSE DESROSIERS.

Witnesses:
CALEB H. SWAN,
EDWIN PLANTA.